Figure 1:
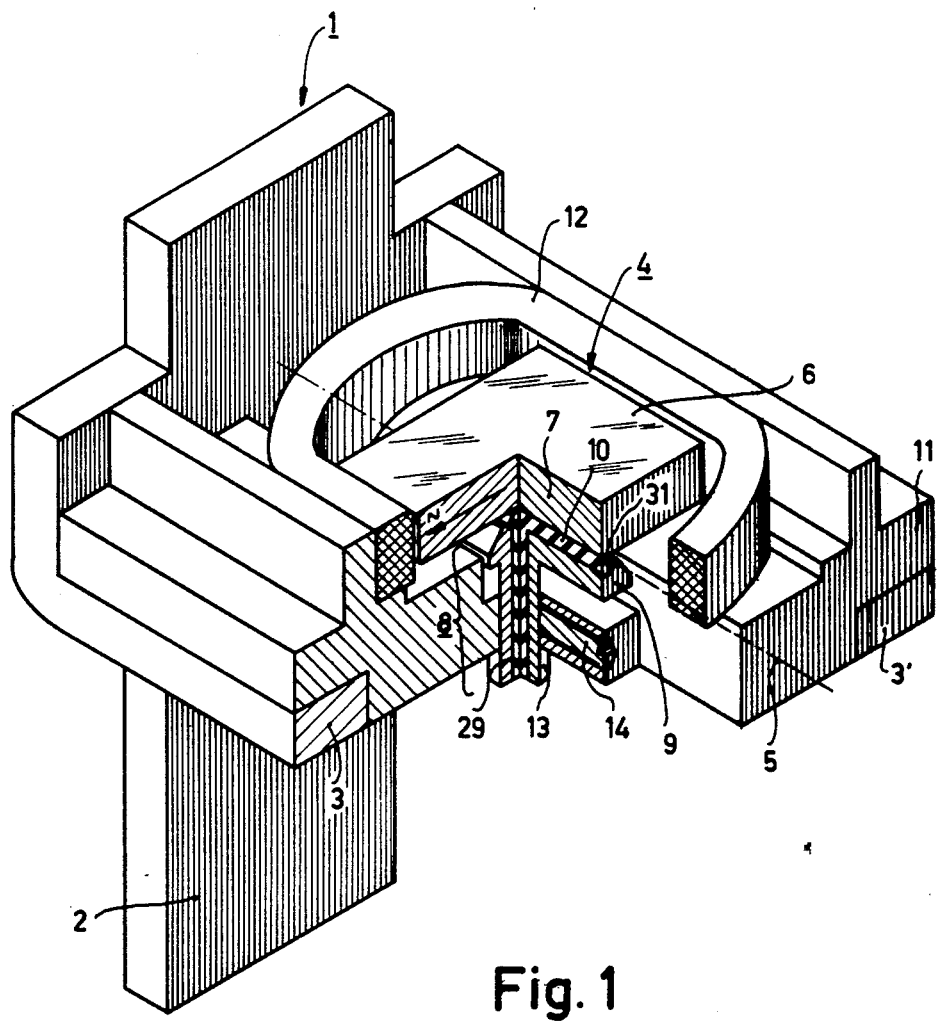

United States Patent

Dragt

[11] 4,021,096
[45] May 3, 1977

[54] ELECTRODYNAMICALLY CONTROLLABLE PIVOTING MIRROR DEVICE

[75] Inventor: Jan Cornelis Willem Dragt, Eindhoven, Netherlands

[73] Assignee: U.S. Philips Corporation, New York, N.Y.

[22] Filed: Jan. 29, 1976

[21] Appl. No.: 653,480

[30] Foreign Application Priority Data

Oct. 20, 1975 Netherlands ............... 7512258

[52] U.S. Cl. ............................ 350/6; 350/285
[51] Int. Cl.² ............................... G02B 27/17
[58] Field of Search ......... 350/6, 7, 285; 178/7.6

[56] References Cited

UNITED STATES PATENTS

| | | | |
|---|---|---|---|
| 3,011,124 | 11/1961 | Hermann et al. | 178/7.6 |
| 3,071,036 | 11/1963 | McKnight et al. | 350/6 |
| 3,544,221 | 12/1970 | Putnam | 350/6 |

FOREIGN PATENTS OR APPLICATIONS

| | | | |
|---|---|---|---|
| 2,531,069 | 1/1976 | Germany | 350/285 |
| 354,117 | 6/1961 | Switzerland | 350/7 |
| 1,393,896 | 5/1975 | United Kingdom | 350/6 |

*Primary Examiner*—John K. Corbin
*Assistant Examiner*—Jon W. Henry
*Attorney, Agent, or Firm*—Frank R. Trifari; Simon L. Cohen

[57] ABSTRACT

An electrodynamically controllable pivoting mirror device for an apparatus for optically reading an information carrier with the aid of a beam of radiation, in particular for a video-disc player which utilizes optical reading, the mirror device being provided with a frame on which a mirror, which is mounted with the aid of an elastic plastic, is pivotably disposed, which mirror is pivotable by means of electrodynamic control means consisting of electromagnets and/or control coils. The elastic plastic consists of a rubber-like plastic compound, preferably of a silicone rubber, which is exclusively connected to the underside of the pivoting mirror, the pivoting mirror being supported by a mirror support to which the plastic compound is also connected and which at its side which is nearest the pivoting mirror has a cross-section which is substantially smaller than the surface area of the pivoting mirror and is located at a distance from the pivoting mirror which is less than 3 mm, for example of the order of magnitude of 0.5 mm. In the mirror support a supply duct may be formed which terminates in the end of the mirror support which faces the pivoting mirror. For manufacturing the mirror bearing arrangement, the mirror support and the pivoting mirror are brought into a mutual spatial relationship which substantially corresponds to that of the finished mirror bearing arrangement, after which a plastic compound in viscous condition is applied through the supply duct, the compound being allowed to cure at a later stage.

6 Claims, 2 Drawing Figures

ELECTRODYNAMICALLY CONTROLLABLE PIVOTING MIRROR DEVICE

The invention relates to an electrodynamically controllable pivoting mirror device for an apparatus for optically reading the information tracks of an information carrier with the aid of a radiation beam which is produced by a radiation source, in particular for a video-disc player which employs optical reading, the device comprising: a frame, a pivoting mirror which is mounted on the frame so as to be pivotable about a pivotal axis or pivotpoint and comprising a base having a light-reflecting surface (top) and a mirror bearing arrangement which co-operates with the side (underside) of the pivoting mirror which faces away from the reflecting surface, which bearing arrangement comprises an amount of an elastic rubber-like plastic disposed between the underside of the pivoting mirror and stationary, substantially rigid parts of the device, as well as electrodynamic control means for causing the pivoting mirror to pivot under the influence of an electrical voltage and comprising permanent magnets and-/or electrical control coils.

Swiss Patent Specification CH-PS No. 354.117 describes a pivoting mirror device in which the pivoting mirror consists of a permanent-magnetic body on which a reflecting layer is deposited. Thus, the base of the pivoting mirror at the same time constitutes one of the electrodynamic control means, namely a permanent-magnetic part thereof which is connected to the pivoting mirror. The base is pivotably mounted in that it is embedded in a rubber-like compound which is disposed between the pole pieces of a U-shaped yoke on which a control coil is mounted. By energizing the control coil the mirror is subjected to a torque so that it performs a pivoting movement in the elastic material in which it is embedded. It is alternatively possible to mount the pivoting mirror in a rubber-like compound which is located in a space between the pole pieces of two mutually perpendicular yokes which are each provided with an associated control coil, so that the reflecting surface can pivot about two mutually perpendicular axes.

The known pivoting mirror was intended for use in television receivers of the type in which a light beam instead of an electron beam is controlled. In view of the application pursued, in particular with respect to the dimensions of television tubes at that time, only a slight movability of the pivoting mirror was required, so that completely embedding the pivoting mirror leaving the reflecting surface free presented a good solution for the object in view. In recent years there has been a substantial revival of the interest in pivoting mirror devices in view of applications in video disc players. At present disc players are developed in which video information contained in a rotary disc can be read with the aid of light beam, for example, a laser beam, which with the aid of optical means, among which a pivoting mirror device, is aimed at the disc for accurately following and reading the tracks on the disc, see for example the articles "The Philips VLP System", Philips Technical Review 33, 178-193, No. 7; "Ein neues Bildplattensystem mit transparanter Folie", Funkschau, Heft 20, 2286-2288, 1974, and "The MCA Disco-Vision System", Journal of the SMPTE, volume 83, July 1974. For applications in such video disc players the pivoting mirror device should comply with requirements other than those which are known from the said Swiss Patent Specification. Specifically, a much greater movability of the mirror is required, i.e. that a comparatively large deflection of the pivoting mirror must be obtainable at a comparatively low frequency using a comparatively low power. The pivoting mirror device is included in an automatic tracking system which serves for following the information tracks located on the video disc with the read beam. The speed of revolution of the video disc is 1500 or 1800 revolutions per minute, depending on the mains frequency, which may be 50 or 60 Hz respectively. For following the information track the pivoting mirror device must be capable of following an oscillation of the track with an amplitude of 200 $\mu$ at an oscillation frequency of 25 Hz.

In a pivoting mirror device for a video disc player it is highly desirable that the pivoting mirror is pivotable about a clearly defined pivotal axis or, when the mirror is pivotable about several pivotal axes, that it is pivotable about a clearly defined pivotpoint. The known pivoting mirror device does not meet this requirement to a satisfactory extent. Owing to the pivoting mirror being completely embedded in the plastic compound, it is difficult to define a pivotal axis or pivot point, while during production of such pivoting mirror devices it will be difficult to reproduce the location of the pivotal axis or pivot point in the various individual products with the required accuracy.

It is an object of the invention to provide a pivoting mirror of the type mentioned in the preamble which is particularly suitable for application in video disc players, namely by such a bearing arrangement that the requirements of sufficient movability of the pivoting mirror, low power consumption and accurate definition of the pivotal axis or the pivot point are met to a much greater extent. For this purpose the invention is characterized in that the elastic rubber-like plastic compound is exclusively connected to the underside of the mirror, that the stationary part of the device to which the plastic compound is connected, at its side which is nearest the underside of the pivoting mirror, has a cross-section which is substantially smaller than the surface area of said underside, and that furthermore the distance between the underside of the pivoting mirror and said stationary part is less than 3 mm.

In the pivoting mirror in accordance with the invention the pivoting mirror is disposed on a plastic bearing arrangement, while the portion of the rubber-like elastic compound which is deformed during the pivoting movements has only a small cross-section relative to the dimensions of the pivoting mirror, and furthermore the distance between the pivoting mirror and the stationary parts to which the pivoting mirror is connected is small. Owing to these small dimensions of the portion of the rubber-like compound which is deformed during pivoting movements of the pivoting mirror a comparatively accurate definition of the pivotal axis or the pivotpoint is obtained. Moreover, this yields the required movability of the mirror, while of course a suitable choice must be made from the available elastic rubber-like materials. Preferably, in accordance with an embodiment of the invention, a silicone-rubber is used for this purpose. Excellent results have been obtained using this material. A great advantage in this respect appeared to be that the pivoting mirror device was found to be highly resistant to stringent vibration and shock tests, and that this embodiment of the pivoting mirror device has a high zero point stability. The zero point stability is to be understood to mean the property that the pivoting mirror always assumes substantially the same neutral position in the absence of control signals at the control coils.

An embodiment which is of particular interest in order to avoid parasitic resonances of the pivoting mirror device is characterized in that the center of gravity of the pivotable part of the pivoting mirror device, which comprises the pivoting mirror itself as well as all parts which are rigidly connected thereto, is substantially disposed at the location of the pivotal axis or the pivot point respectively.

The scope of the invention also includes a method of manufacturing a pivoting mirror device of the type discussed hereinbefore. The method is characterized in that it includes at least the following steps: the manufacture of a mirror support from a material with a high coefficient of elasticity relative to the rubber-like plastic compound, which support is provided with an internal plastics supply duct with both ends open. One of the ends is disposed at a side of the mirror support which is to face the pivoting mirror, bringing the pivoting mirror and the mirror support into a spatial relationship, which at least substantially corresponds to that which exists in the finished pivoting mirror device. The plastic compound is applied in a viscous, moldable condition through the supply duct and fills therewith the space between the underside of the pivoting mirror and the mirror support therewith, followed by the curing of the plastic compound to a rubber-like compound.

By the use of this method it is possible to manufacture a pivoting mirror device in accordance with the invention with very small dimensions of the mirror bearing arrangement. This will be described in more detail in the description of the Figures, when discussing two specific embodiments of the invention.

One embodiment of the method in accordance with the invention, which is particularly suitable for manufacturing a pivoting mirror device in which the pivoting mirror is substantially pivotable about only a single axis parallel to the reflecting surface of the pivoting mirror is characterized in that the mirror support at its side which is to face the pivoting mirror is provided with a channelshaped slot in which the plastics supply duct terminates, and which when the mirror support is pressed home against the underside of the pivoting mirror, constitutes a space which is enclosed at its periphery exept for one or more air escape apertures, that before the plastic is applied the mirror support is pressed against the underside of the pivoting mirror, and that furthermore after the application of the plastic compound and before curing thereof takes place, the pivoting mirror and the mirror support are moved over a small distance relative to each other perpendicular to the reflecting surface of the pivoting mirror until their ultimate spatial relationship is obtained. With this embodiment of the method it is possible to manufacture pivoting mirror devices of uniform quality and with uniform properties. The plastic compound is applied until it emerges from the air escape apertures. The displacement of the mirror support relative to the pivoting mirror, which is subsequently effected, can readily and exactly be reproduced during the manufacture of the various pivoting mirror devices.

In pivoting mirror devices with a pivoting mirror which is pivotable about substantially every axis parallel to the reflecting surface and passing through a single pivotpoint, it is of significance that the mirror bearing arrangement allows no rotation of the pivoting mirror about a neutral optical axis perpendicular to the reflecting surface of the pivoting mirror in its neutral position and passing through the pivot point. In view of this, a further embodiment of the invention is of importance, which is characterized in that the plastics supply duct in the mirror support at least near the end which faces the underside of the pivoting mirror has an nonround cross-section.

For reasons of manufacturing technology it may then be of advantage when at least the part of the mirror support which is nearest the underside of the pivoting mirror consists of a tube with a polygonal and preferably square cross-section.

In order to also enable an exact dosaging of the amount of rubber-like plastic in such a pivoting mirror device and also to obtain an accurately reproducable cross-section of the plastic compound in the vicinity of the pivot point a following embodiment is of importance which is characterized in that at the underside of the pivoting mirror a bearing auxiliary component is secured which is provided with a cup-shaped cavity, the open side of the cup facing the underside of the pivoting mirror and adjoining it with its circumference, and that the bottom of the cup is provided with an opening for the passage with play of the end of the mirror support which faces the pivoting mirror.

Figure 2:
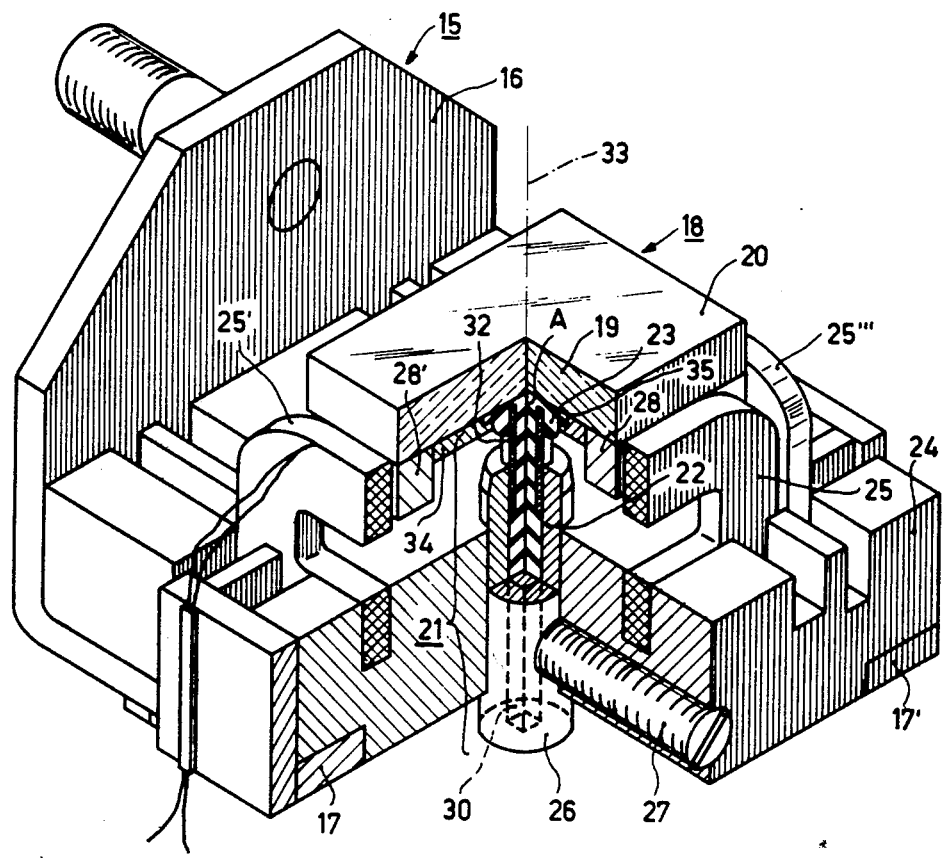

The invention will now be described in more detail with reference to the drawing which shows two embodiments of the invention and in which:

FIG. 1 is a perspective view, part cross-section, of a pivoting mirror device in which the pivoting mirror is pivotable about a single pivotal axis parallel to the reflecting surface, and FIG. 2 is a perspective view, part cross-section, of an embodiment of a pivoting mirror device in which the pivoting mirror is pivotable about every axis parallel to the reflecting surface and passing through a specific pivot point.

The pivoting mirror device of FIG. 1 comprises a frame 1 which is made of a nonmagnetic sheet material and a mounting plate 2, as well as two carrier arms 3 and 3'. In the continuation of the description, when two or more identical components such as these are mentioned in a more general way, apostrophes will be omitted. On the frame 1 a pivoting mirror 4 is disposed so as to be pivotable about a single pivotal axis 5 which is parallel to a reflecting layer 6 which is deposited on the glass base 7 of the pivoting mirror. The reflecting layer 6 is so thin that it cannot be shown in cross-section in the Figure. At the underside of the pivoting mirror 4 a mirror bearing arrangement 8 is disposed which comprises an amount of an elastic rubber-like plastic 10 which is disposed between the underside of the pivoting mirror and a mirror support 9. The mirror support 9 is secured in a plastic block 11 which is mounted on the carrier arms 3. This block also carries the electrodynamic control means for causing the pivoting mirror 4 to pivot under the influence of an electrical voltage, which means comprise the permanent magnetic base 7 of the pivoting mirror as well as a control coil 12. For clarity the direction of magnetization of the permanent magnetic base 7 is indicated with the aid of an arrow. The letter N near the end of the arrow indicates that the magnetic north pole is located there.

The elastic rubber-like plastic compound 10 is exclusively located at the underside of the mirror and is connected thereto by means of a narrow ridge. Said compound consists of silicone rubber, which is a material which excellently adheres to other materials. Further in the description, when discussing the method according to the invention, the manner in which the silicone rubber compound is applied will be discussed in more detail. The mirror support 9 is stationarily mounted in the block 11. It is substantially T-shaped, and consists of an upper bar parallel to the reflecting layer 6 of the pivoting mirror and a pin which is perpendicular thereto, bearing the reference numeral 13. This pin has an external cylindrical shape and is movable is an opening in the block 11. As a result the pivoting mirror 4 can be adjusted to the correct height during assembly, after which the pin 13 can be locked with the aid of a locking bolt 14. At its side which is nearest the underside of the pivoting mirror and mirror support 9 has a cross-section which is substantially smaller than the surface area of the underside of the pivoting mirror. Furthermore, the distance between the underside of the pivoting mirror and the mirror support 9 is less than 3 mm and for the embodiment shown it is approximately 0.15 mm in reality. As a result of this, the location of the pivotal axis 5 is very well defined.

The pivoting mirror device of FIG. 2 comprises a frame 15, which includes a mounting plate 16 as well as two carrier arms 17, a pivoting mirror 18 consisting of a glass base 19 with a reflecting layer 20, a mirror bearing arrangement 21 comprising a mirror support 22 and an elastic compound 23 of silicone rubber. The mirror support 22 is mounted in a plastic block 24, which in addition to the mirror bearing arrangement 21 also carries four control coils 25. In a similar way as the pivoting mirror device of FIG. 1, the pin 26 of the mirror support 22 is again movably diposed in a cylindrical bore in a plastic block 24, and is locked with the aid of a locking bolt 27. At the underside of the pivoting mirror 18 four permanent magnets 28 are glued. Only two of these magnets are shown, designated 28 and 28', which co-operate with the control coils which are designated 25 and 25'.

In this pivoting mirror device the rubber-like compound is also exclusively connected to the underside of the mirror, the cross-section of the side of the mirror support 22 which is nearest the underside of the pivoting mirror 18 is substantially smaller than the surface area of the underside of the mirror, and the distance between the mirror support and the pivoting mirror is approximately 0.3 mm.

However, unlike the pivoting mirror device of FIG. 1, the center of gravity of the pivotable part of the device, which comprises the pivoting mirror 18 itself, as well as the magnets 28 which are connected thereto, and the bearing auxiliary component 34, is disposed substantially at the location of the pivot point which is designated by the letter A in the Figure. In view of the small distance of the end of the tube 32 to the underside of the pivoting mirror 18 this pivot point is located closely underneath the underside. By a correct dimensioning of the pivoting mirror 18, the magnets 28 and the bearing auxiliary component 34, it is possible to make the center of gravity of the pivotable part of the pivoting mirror device coincide with the pivot point, without requiring the undesired addition of extra masses. An unnecessary increase of the overall mass of the pivotable part has an adverse affect on the dynamic behavior of the control circuit in which the pivoting mirror device is included.

The two mirror supports 9 and 22 are each provided with an internal and at both ends open plastics supply duct 29 and 30 respectively. For applying the plastic compound 10 and 23 respectively, the relevant pivoting mirrors 4 and 18 and their associated mirror supports 9 and 22 respectively are brought into a spatial relationship which at least substantially corresponds to that which exists in the finished pivoting mirror devices shown in FIG. 1 and 2. Subsequently, the plastic compound is applied through the supply duct in a viscous moldable condition and the space between the end of the mirror support and the underside of the pivoting mirror is filled. After this, curing of the plastic compound takes place. Several suitable plastics are available to the expert. In practice silicone rubbers have performed satisfactorily, for example, that from Dow Corning, type Sylastic 732 RTV, or that from Rhone-Poulenc, type FAC 1. The first of these two silicone rubbers is slightly softer, the second somewhat harder. The use of silicone rubbers offers substantial advantages for the object pursued. Such rubbers have the property that they excellently adhere to a variety of materials, so that applying the plastic compound in a viscuous condition and subsquently allowing it to cure suffices to make it adhere firmly to the previously discussed materials used for the pivoting mirror device. Furthermore, silicone rubbers are highly stable in time i.e. that their properties change very little in the course of time. Another property, which has been found to be very important for the object in view, is that after elastic deformation the material very accurately resumes its original shape. This means that no separate provisions are required to return the pivoting mirror to its neutral position in the absence of control voltages. Exclusively under the influence of the elastic forces exerted by the silicone rubber compound, the mirror returns to its original position with a very high precision. Further favorable properties are that the elasticity and the other properties of silicone rubbers vary little in the case of temperature variations and that they are chemically extremely stable.

In the pivoting mirror device of FIG. 1, in which the pivoting mirror is substantially exclusively about the pivotable axis 5 parallel to the reflecting surface 6 the mirror support is provided with a channel-shaped slot 31 at its side which faces the pivoting mirror. The plastics supply duct 29 terminates therein. When the mirror support 9 is pressed home against the underside of the pivoting mirror 4 the slot 31 forms an enclosed space, apart from two air escape apertures which are formed by the terminations of the slot 31 in the sides of the upper bar of the mirror support 9. Before the silicone rubber compound is applied in a viscous condition the mirror support 9 is pressed against the underside of the pivoting mirror 4. Subsequently, the silicone rubber compound is applied through the supply duct 29 until it emerges from the two air escape apertures. Application of silicone rubber is now discontinued and the mirror support 9 is now withdrawn over the desired small distance relative to the underside of the pivoting mirror 4. As previously stated, the distance is 0.15 mm. After curing of the silicone rubber compound the bearing arrangement 8 of FIG. 1 is completed. An advantage, which has not yet been mentioned, of this method of applying the silicone rubber compound is that accurate dosaging of the required amount of silicone rubber is ensured.

The bearing arrangement 21 of the pivoting mirror device of FIG. 2 is manufactured in a slightly differnt manner. At its top end the mirror support 22 is provided with a plastics supply duct 30 of square cross-section. This part of the mirror support consists of a length of metal tube 32 of square cross-section which is placed in the remaining part of the mirror support 22, i.e. The pin 26. Although according to the drawing the pin also has an internal duct of square cross-section, this is not necessary. The use of a plastics supply duct of non-round cross-section is of importance in order to counteract rotations of the pivoting mirror 18 about the neutral optical axis 33. At the underside of the pivoting mirror 18 a bearing auxiliary component 34 is mounted. This is provided with a cup-shaped cavity 35, whose open side faces the underside of the pivoting mirror and adjoins this with its circumference. This component is connected to the glass base 19 by gluing. The bottom of the cup-shaped cavity 35 is provided with an opening through which the metal tube 32 is passed with play. During manufacture of the bearing arrangement 21 of the pivoting mirror device of FIG. 2 the mirror support 22 and the pivoting mirror 18 are brought into their ultimate mutual spatial relationship before the silicone rubber compound is applied. Subsequently, the compound is applied via the plastics supply duct 30 until the compound emerges from the aperture in the auxiliary component 34. After curing of the silicone rubber compound the bearing arrangement is finished. With this pivoting mirror construction a good reproducibility of the elastic properties of the bearing arrangement is obtained in particular owing to the fact that they are largely determined by the dimensions of the metal tube 32 as well as the opening in the auxiliary component 34. The cause of this is that the elastic properties, apart of course from the silicone rubber itself, are determined by the shape of the portions of the silicone rubber compound, in particular of course by those portions which are subjected to elastic deformations during pivoting movements of the pivoting mirror 18.

The mirror supports 9 and 22 can be made of metal but also of a rigid plastic. They can be made of metal with the aid of a machining operation or by metal casting, while when using a plastic especially thermosetting plastics are suitable.

What is claimed is:

1. An electrodynamically controllable pivoting mirror device for an apparatus for optically reading the information tracks of an information carrier with the aid of a radiation beam produced by a radiation source, in particular for a video-disc player which employs optical reading, the device comprising:

a frame, a pivoting mirror which is mounted on the frame so as to be pivotable about a pivotal axis or a pivot point and comprising a base having a light-reflecting surface, a mirror bearing arrangment which co-operates with the underside of the pivoting mirror which faces away from the reflecting surface, which arrangement comprises an amount of an elastic rubber-like plastic which is disposed between the underside of the pivoting mirror and substantially rigid stationary parts of the device, as well as electrodynamic control means for causing the pivoting mirror to pivot under the influence of an electrical voltage and comprising permenent magnets and electrical control coils, characterized in that the elastic rubber-like plastic compound is connected to the underside only of the mirror, the stationary part of the device to which the plastic compound is connected, at its side which is nearest the underside of the pivoting mirror, has a cross-section which is substantially smaller than the surface area of the said underside, and that furthermore the distance between the underside of the pivoting mirror (4, 18) and said stationary part (9, 22) is less than 3 mm.

2. A pivoting mirror device as claimed in claim 1, characterized in that the rubber-like plastic compound consists of a silicone-rubber.

3. A pivoting mirror device as claimed in claim 1, characterized in that the centre of gravity of the pivotable part of the pivoting mirror device which comprises the pivoting mirror itself as well as all parts which are rigidly connected thereto, is substantially disposed at the location of the pivotal axis or the pivot point.

4. A pivoting mirror device as claimed in claim 1, the pivoting mirror being pivotable about substantially every axis parallel to the reflecting surface and passing through a single pivot point, characterized in that the plastics supply duct in the mirror support, at least near the end which faces the underside of the pivoting mirror, has a non-round cross-section.

5. A pivoting mirror device as claimed in claim 4, characterized in that at least the part of the mirror support which is nearest the underside of the pivoting mirror consists of a tube of polygonal, preferably square, cross-section.

6. A pivoting mirror device as claimed in claim 1, the pivoting mirror being pivotable about substantially every axis parallel to the reflecting surface and passing through a single pivot point, characterized in that at the underside of the pivoting mirror a bearing auxiliary component is secured, which is provided with a cup-shaped cavity, the open side of the cup facing the underside of the pivoting mirror and adjoining it with its circumference, and the bottom of the cup is provided with an opening for the passage with play of the end of the mirror support which faces the pivoting mirror.

* * * * *

UNITED STATES PATENT AND TRADEMARK OFFICE
CERTIFICATE OF CORRECTION

PATENT NO. : 4,021,096
DATED : May 3, 1977
INVENTOR(S) : JAN CORNELIS WILLEM DRAGT

It is certified that error appears in the above-identified patent and that said Letters Patent are hereby corrected as shown below:

Col. 5, line 11, "is" second occurence should be --in--;

line 16, "and" should be --the--;

line 66, "affect" should be --effect--;

Col. 6, line 44, after "exclusively" should be --pivotable--;

Col. 7, line 7, "The" should be --the--;

Claim 1, line 21, "permenent" should be --permanent--;

line 32, cancel "(4, 18)"; cancel "(9, 22)".

Signed and Sealed this second Day of August 1977

[SEAL]

Attest:

RUTH C. MASON
*Attesting Officer*

C. MARSHALL DANN
*Commissioner of Patents and Trademarks*